Nov. 22, 1932.  G. CARLSON  1,888,846
CABLE TERMINAL HOLDER AND RECEPTACLE FOR HOUSE WIRING SYSTEMS
Filed Sept. 11, 1929
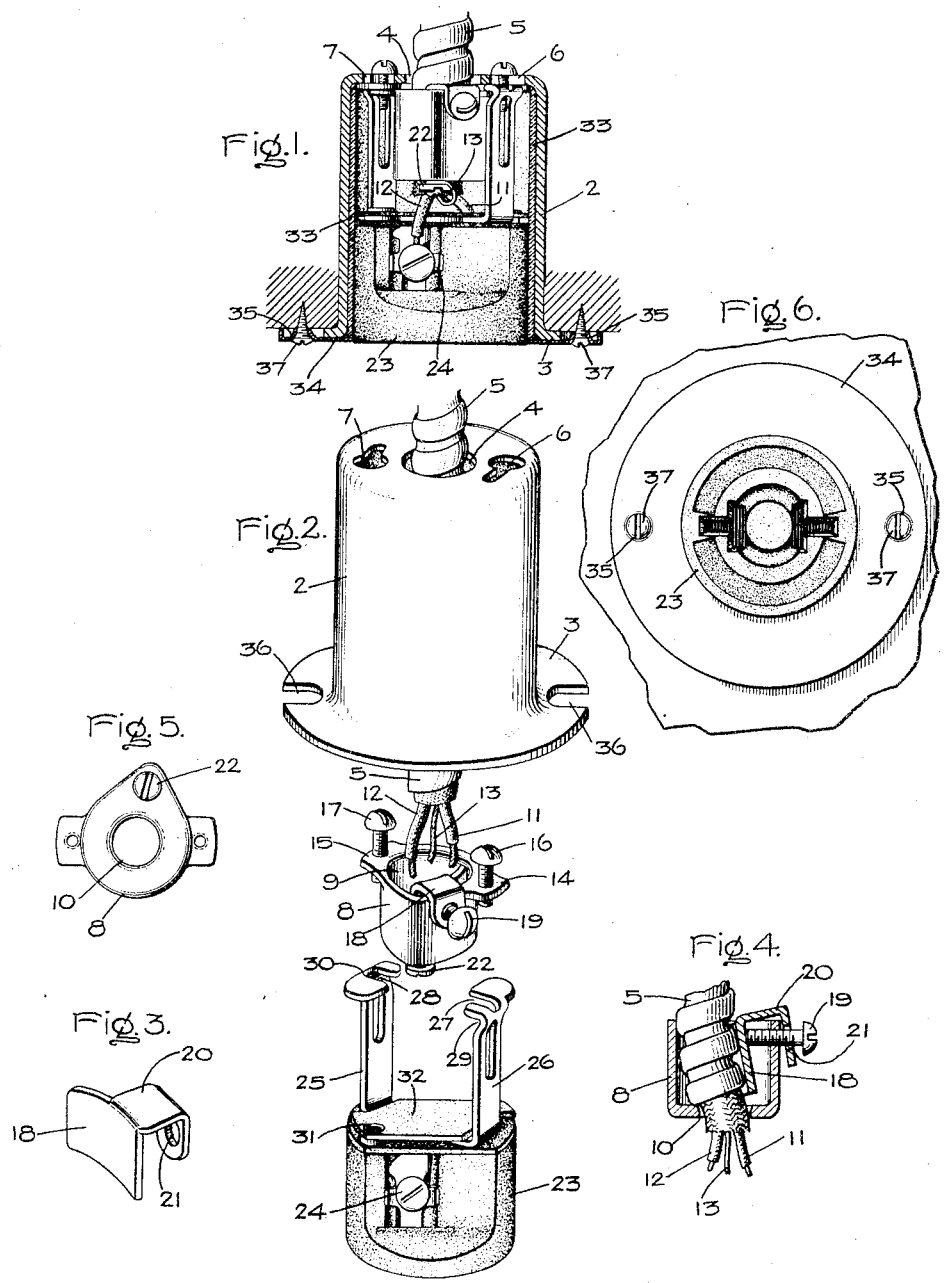
Inventor:
George Carlson,
by Charles E. Tullar
His Attorney Patented Nov. 22, 1932

1,888,846

UNITED STATES PATENT OFFICE

GEORGE CARLSON, OF ANSONIA, CONNECTICUT, ASSIGNOR TO GENERAL ELECTRIC COMPANY, A CORPORATION OF NEW YORK

CABLE TERMINAL HOLDER AND RECEPTACLE FOR HOUSE WIRING SYSTEMS

Application filed September 11, 1929. Serial No. 391,898.

My invention relates to wiring devices and in particular to wiring devices comprising receptacles for supporting and enclosing plug receptacles, fuse blocks, switches, or other electrical wiring devices such as are used in wiring systems.

Heretofore in such systems the means provided have been such that the method of making the connections between the cable and the wiring devices has been very awkward, tedious and slow. It is an object of my invention to provide an improved form of wall receptacle and cable terminal holder therefor which will facilitate and expedite the method of making such connections; to provide a new and improved form of receptacle such that the cable may be drawn forward through the receptacle and thereby make it possible that the necessary connections between the cable and the device to be housed in such receptacle may be made in front of the wall and outside of the receptacle. It is an object to provide a receptacle which may be readily applied to or removed from the wall and having a mouth and having also perforations at the bottom thereof to enable the cable to be drawn forward from behind the wall through the bottom and through the mouth of the receptacle to enable the connections to be made with the terminals of a wiring device in the open and to enable the cable to be pushed back through the receptacle to such an extent as to permit of the wiring device connected with the cable being located in place within the receptacle and the cable terminal holder being seated therein. It is also an object to provide means for preventing the end of the cable from passing out of the receptacle through the bottom thereof. The features of the invention, however, will be better understood from the following specification and claims, reference being had to the accompanying drawing in which Fig. 1 is a side view in section of the receptacle applied to a wall. This figure also shows the cable connected with an outlet device, the latter being in place within the receptacle. Fig. 2 shows a so-called exploded view in perspective from the rear of the receptacle and the cable terminal holder (the latter for preventing the end of the cable from passing through the bottom of the receptacle) and an outlet device. Fig. 3 shows one of the elements of the cable holding device in perspective. Fig. 4 is a view in section and in elevation of the cable holder showing the cable clamped thereto. Fig. 5 is a plan view from the front of the cable terminal holder. Fig. 6 is a top view of the receptacle in position in the wall. In this view the cover plate or ring for the receptacle is also shown.

Referring more in detail to the drawing, and in particular to Figs. 1 and 2, it will be seen that the receptacle 2 is in the form of a cup having a flange 3 and having perforations in the bottom thereof, one of these perforations 4 being large enough to admit the cable element 5. Two other perforations 6 and 7 are provided for receiving screws for securing the cable terminal holder 8 to the bottom of the receptacle. The cable terminal holder 8 is in the form of a thimble, having a mouth 9 adapted to receive the end of the cable 5. The holder is provided with an opening 10 in the bottom thereof through which the conductors 11, 12 and 13 are adapted to pass as indicated in Fig. 1. The holder is provided with a pair of lateral projections 14 and 15 threaded to receive the corresponding screws 16 and 17, the heads of which screws are adapted to pass through the perforations 6 and 7 in the bottom of the receptacle 2. These perforations 6 and 7 are provided with lateral slots to enable the cable terminal holder to be rotated and the necks of the screws carried into these slots after which the screws 16 and 17 may be tightened, thereby clamping the cable terminal holder to the bottom of the receptacle. The holder is provided with a plate or shoe 18, see Fig. 3, which is located between the end of the cable and the side of the holder when the end of the cable is inserted in the holder. This plate is adapted to be clamped against the end of the cable by the screw 19. This screw is in threaded engagement with the side of the terminal holder 8, as shown in Fig. 4. It will be seen that the plate 18 is provided with a flange 20 through the opening 21 of which the screw 19 extends. As shown, the opening 21 is larger than the screw. The object of this flange is to prevent the plate 18 from falling when the screw 19 is loosened. Sometimes it may be convenient to omit the plate 18 and secure the cable directly by the screw 19.

The form of device shown in the drawing is especially adapted to be used in connection with a cable provided with a bare or so-called ground wire 13, the end of which latter is adapted to be clamped to the terminal holder 8 by the screw 22, thus establishing a ground connection between the conductor 13 and the terminal holder 8. By this arrangement the armor of the cable is effectively grounded with the wire 13 of the cable inasmuch as the armor is effectively connected with the terminal holder 8 by means of the screw 19 and the shoe 18.

The electrical wiring device 23, here illustrated as being a plug receptacle, is provided with a pair of terminals 24, one on either side and offset with respect to each other as customary. As indicated in Figs. 2 and 6, the wiring device is mounted on a supporting bracket provided with prongs 25 and 26 having slots 27 and 28 which latter are adapted to engage the necks of the screws 16 and 17 and to be clamped to the bottom of the receptacle 2 by means of said screws. As shown in Figs. 1 and 2, the prongs 25 and 26 are folded to form recesses 29 and 30 for receiving the projections 14 and 15 respectively, thereby increasing the rigidity of connection between the prongs 25 and 26 and the terminal holder 8. As shown in Fig. 2, the bracket is secured to the wiring device 23 in any suitable manner as for example by means of rivets 31, the prong being covered by a plate of insulation 32. After the end of the cable is secured to the terminal holder 8 as indicated in Fig. 4 and after the wiring device 23 is secured to the terminal holder 8, the conductor 12 may be secured to the front terminal 24 as shown in Fig. 1, and the conductor 11 may be similarly connected to the corresponding rear terminal. After the connections between the cable conductors and the terminals have been made, cable 5 may be pressed back through the perforation 4 and the wiring device 23 and the holder 8 thrust through the mouth of the receptacle into position therein and locked securely to the bottom of the receptacle by means of the screws 16 and 17 as indicated. In order to insulate the terminals 24 and the bare sections of the wires 11 and 12 from the wall of the receptacle 2, a lining 33 of insulating material is interposed between the wiring device and the receptacle as shown in Fig. 1. After the terminal holder and wiring device have been secured to the receptacle as described, the receptacle may be then inserted in the wall as shown in Fig. 1 and the cover plate or ring 34 placed over the flange 3 with the perforations 35 in the ring 34 in alignment with the perforations 36 in the rim 3 of the receptacle and the receptacle clamped to the wall by means of screws 37. It will be seen that inasmuch as the ring 34 is clamped against the receptacle 2 and inasmuch as the receptacle 2 is grounded with respect to the cable 5 the ring 34 is grounded with respect to the armor of the cable 5 and to the conductor 3, thus insuring protection against shocks by anyone who may touch the ring 34.

By my invention, I provide a wiring construction wherein the end of the cable may be threaded through the opening in the rear of the box and drawn forward through to the front of the box where the connections to the cable holder and to the wiring device may be made readily, after which the cable holder and wiring device may be inserted into the receptacle and fastened therein, the cable being pushed back through the opening at the rear of the box as the holder and wiring device enter the box. By this means there is avoided the necessity of crowding more or less of the cable and the cable wires into the box as is the case when the cable is first fastened in an opening in the box with its ends protruding far enough to enable connections to the wiring device to be made. After the cable holder and wiring device have been fastened in the receptacle, the receptacle, if it is not already in position in the wall, may be placed in an opening in the wall and fastened therein from the front of the wall.

It is characteristic of my invention that the cable, instead of being fastened directly in an opening in the receptacle, a thing which has been the practice heretofore, is fastened to a holder independently of the receptacle, the holder being then attached to the receptacle by means distinct from the means which clamps the cable to the holder. By reason of this arrangement the wiring device may be connected to the conductors of the cable in the opening in front of the box, a thing which greatly facilitates the performance of this operation.

While I have shown the cable holder provided with projections which are adapted to seat in recesses formed in the ends of prongs connected to the wiring device thereby to attach the holder and wiring device together, many other means of securing the holder and wiring device together may be used. It may even be found desirable to secure them permanently together. By attaching the holder and wiring device together a unitary structure is formed to which the cable may be clamped and the conductors connected before it is placed in the receptacle and secured therein.

It will be understood that while I have elected to describe my invention in connection with the devices of the specific forms shown in the drawing, I do not wish to be so limited inasmuch as variations may be readily made without departing from the spirit of the invention or the scope of the claims contained herein.

What I claim as new and desire to secure by Letters Patent of the United States is:

1. In a wiring system, in combination with a receptacle, a cable terminal holder, an opening in the bottom of said receptacle through which a cable may be inserted, said holder being hollow and adapted to receive the end of said cable, means for securing the armor of said cable to said holder, an electric device and a terminal therefor, means for securing said device to said holder and for connecting a conductor in said cable to said holder, and means for securing the holder within said receptacle, said holder being larger than said opening to prevent the holder from passing therethrough before the holder is secured to the receptacle.

2. In a wiring system, in combination with a receptacle, a cable terminal holder, an opening in the bottom of said receptacle through which a cable may be inserted, said holder being hollow and adapted to receive the end of said cable, means for securing the armor of said cable to said holder, an electric device and a terminal therefor, means for securing said device to said holder and for connecting a conductor in said cable to said terminal, and means for securing the holder within said receptacle, said holder being larger than said opening to prevent the holder from passing therethrough before the holder is secured to the receptacle, and means on said holder for connecting a conductor in said cable thereto.

3. In a wiring system, in combination with a receptacle, a cable terminal holder, an opening in the bottom of said receptacle through which a cable may be inserted, said holder being hollow and adapted to receive the end of said cable, means for securing the armor of said cable to said holder, an electric device and a terminal therefor, means for securing said device to said holder and for connecting a conductor in said cable to said terminal, and means for securing the holder within said receptacle, said holder being larger than said opening to prevent the holder from passing therethrough before the holder is secured to the receptacle, said means for securing said cable to said holder comprising a plate interposed between the cable and the holder and means for clamping the cable between said plate and said holder.

4. A receptacle for a wiring system having a mouth and an opening, the latter being located in the rear of the receptacle and opposite the former, a cable terminal holder, a seat in said receptacle for said holder, said seat being located about said opening, said mouth being larger than said holder whereby the holder may be thrust through said mouth into the receptacle, said opening being smaller than said holder whereby the holder is prevented from passing through said opening, means for maintaining said holder on said seat, means for connecting said holder with a conductor in said cable, an electric device and a terminal therefor, and means for securing said device to said holder and for connecting a conductor in said cable to the terminal of said device.

5. A receptacle for a wiring system having a mouth and an opening, the latter being located in the rear of the receptacle and opposite the former, a cable terminal holder, a seat in said receptacle for said holder, said seat being located about said opening, said mouth being larger than said holder whereby the holder may be thrust through said mouth into the receptacle, said opening being smaller than said holder whereby the holder is prevented from passing through said opening, means for connecting said holder with a conductor in said cable, an electric device and a terminal therefor, means for securing said device to said holder and for connecting a conductor in said cable to the terminal of said device, and means for securing said holder on said seat in said receptacle.

6. In a wiring system, a receptacle having a mouth through which an electric wiring device may be inserted and an opening through which a cable may pass freely, a cable holder separate from the receptacle adapted to receive a cable, clamping means carried by the holder for fastening a cable thereto, an electric wiring device, said cable being adapted to be fastened to said holder and connected to the wiring device while the holder and wiring device are outside the receptacle, and common means for fastening the holder and the wiring device in the receptacle, the cable being pushed back through said opening when the holder and wiring device are inserted into the receptacle.

7. In a wiring system, the combination of a receptacle having a mouth through which an electric wiring device may be inserted and an opening through which a cable may pass freely, a holder, means for clamping a cable to said holder, means for fastening a wiring device to said holder, and means independent of said cable clamping means for fastening the holder in the receptacle, whereby the cable may be first attached to the holder and connected to the wiring device after which the holder and wiring device may be inserted into the receptacle and fastened therein.

8. In combination, a receptacle having an opening in the front through which a wiring device may be inserted and an opening in the rear through which a cable may pass freely, a cable holder, means for clamping a cable to said holder, a wiring device, means fastening said holder to said wiring device to form a unitary structure, and means for fastening the unitary structure in the receptacle, whereby the cable may be first passed through the openings from the rear of the receptacle, attached to the holder and connected to the wiring device after which the holder and wiring device may be inserted in the receptacle and fastened therein.

9. In combination, a wiring device, a cable holder fastened to the wiring device and forming therewith a unitary structure, means for clamping a cable in the cable holder, and means for fastening the cable holder and wiring device as a unit in a receptacle whereby a cable may be first attached to the holder and electrically connected to the wiring device after which the holder and wiring device may be inserted as a unit into a receptacle and fastened therein.

In witness whereof, I have hereunto set my hand this third day of September, 1929.

GEORGE CARLSON.